3,758,494
PROCESS FOR THE PREPARATION OF 5-(4-AMINOBUTYL)-HYDANTOIN

Geertrudes H. Suverkropp, Geleen, and Werner Reichrath, Stein, Netherlands, assignors to Stamicarbon N.V., Heerlen, Netherlands
No Drawing. Filed Dec. 23, 1971, Ser. No. 211,712
Claims priority, application Netherlands, Dec. 23, 1970, 7018703
Int. Cl. C07d 49/32
U.S. Cl. 260—309.5     6 Claims

ABSTRACT OF THE DISCLOSURE

A process is disclosed whereby 5-(4-aminobutyl)-hydantoin is prepared by the liquid phase hydrogenation of 5-(3-cyanopropyl)-hydantoin or a mixture of 5-(3-cyanopropyl)-hydantoin and 1-ureido-4-cyanovaleramide, in the presence of an inert solvent suspension of a hydrogenation catalyst.

---

The present invention relates to an improved process for the preparation of 5-(4-aminobutyl)-hydantoin by hydrogenation at elevated temperature of 5-(3-cyanopropyl)-hydantoin in the liquid phase with the aid of a hydrogenation catalyst. The 5-(4-aminobutyl)-hydantoin can be converted into lysine by hydrolysis in a known manner.

It is disclosed in U.S. Pat. 2,688,023 that 5-(3-cyanopropyl)-hydantoin can be hydrogenated by first preparing a solution of 5 - (3 - cyanopropyl) - hydantoin in liquid ammonia which is then charged, along with a hydrogenation catalyst, into a hydrogenation bomb. Hydrogen is then introduced into the bomb up to a pressure of 1500 p.s.i. or higher. The solution is heated and this temperature and pressure are maintained until hydrogen is no longer taken up by the reaction mixture. However, conducting the hydrogenation of 5 - (3 - cyanopropyl)-hydantoin according to this known process results in a 5-(4-aminobutyl)-hydantoin yield of only about 55%.

It has now been found that a considerably higher yield can be obtained in the hydrogenation of 5-(3-cyanopropyl)-hydantoin if the hydrogenation is carried out by first preparing a suspension of the hydrogenation catalyst in an inert solvent in which 5-(3-cyanopropyl)-hydantoin is soluble, which suspension is placed under hydrogen pressure and heated to a temperature of at least 50° C. The 5 - (3 - cyanopropyl) - hydantoin starting material is subsequently added to the suspension so prepared and the hydrogenation proceeds. When carrying out the hydrogenation according to this new process, yields in excess of 80% are achieved.

In applicants' simultaneously filed U.S. application Ser. No. 211,713, it is disclosed that when 5-(3-cyanopropyl)-hydantoin is prepared from 4 - cyanobutyraldehyde, a cyanide reactant, an ammonium reactant and a carbon dioxide reactant under controlled conditions, particularly maintaining the reaction pH above about 7 and avoiding acid conditions throughout the process, the compound 1-ureido - 4 - cyanovaleramide is formed along with the 5 - (3 - cyanopropyl) - hydantoin. It has further been found that the presently disclosed method of hydrogenation is extremely well suited for the hydrogenation of a mixture of 5 - (3 - cyanopropyl)-hydantoin and 1-ureido-4-cyanovaleramide. In such case, the 1-ureido - 4 - cyanovaleramide is hydrogenated to 1-ureido - 5 - aminocapronamide, which, along with the 5-(4-aminobutyl)-hydantoin, may also be converted to lysine by hydrolysis. The preparation of lysine starting from a mixture of 5-(3-cyanopropyl)-hydantoin and 1-ureido - 4 - cyanovaleramide is separately treated in applicants' above-mentioned copending U.S. application Ser. No. 211,713.

The present invention therefore provides an improved process for the preparation of 5 - (4 - aminobutyl)-hydantoin by hydrogenation of 5 - (3 - cyanopropyl) - hydantoin whereby substantially higher yields are achieved compared to the prior art. The present invention further provides a process whereby a mixture of 5-(3 - cyanopropyl)-hydantoin and 1 - ureido - 4 - cyanovaleramide can be hydrogenated to a mixture of 5-(4-aminobutyl)-hydantoin and 1 - ureido - 5 - aminocapronamide, from which mixture lysine can be prepared by hydrolysis.

The process of the present invention involves the preparation of a suspension of the hydrogenation catalyst in a solvent in which 5-(3-cyanopropyl)-hydantoin is soluble, and which is an inert solvent under the reaction conditions. Examples of suitable solvents are water, ammonia, aqueous ammonia, alcohols such as methanol, ethanol, propanol, isopropanol, butanols and glycols, and ethers such as dioxane and tetrahydrofuran. For reasons of economy, water is preferred as the solvent.

The solubility of the product to be hydrogenated can be increased by dissolving ammonia in the inert solvent.

An appropriate catalyst for use in the suspension of the present invention may be selected from known hydrogenation catalyst. Examples of suitable hydrogenation catalysts are nickel, cobalt, platinum and palladium which may, but need not, be applied to a supporting carrier material.

The catalyst suspension is placed under hydrogen pressure and heated to a temperature of at least 50° C. Various temperatures above 50° C. can be employed in carrying out the hydrogenation, but in practice, temperatures above 300° C. are less suitable because a too high pressure would be required to maintain a liquid phase.

The hydrogen pressure may be varied within wide limits, for example, from about 1 to 200 atmospheres. If necessary, the initial hydrogen pressure during the addition of the product to be hydrogenated may be different from the hydrogen pressure when the hydrogenation is completed. The total pressure, though not critical to the present process, should be so chosen, in combination with the temperature, that the hydrogenation will take place in the liquid phase.

After the catalyst suspension has been formed and heated, and placed under hydrogen pressure, the product to be hydrogenated is added into the catalyst suspension. This addition may be very suitably carried out by adding the product to be hydrogenated as a solution in the inert solvent. Alternatively, the product to be hydrogenated can wholly or partly be added to the catalyst suspension as a suspension in the inert solvent. In the latter alternative, however, there must be sufficient additional inert solvent in the catalyst suspension so as to allow the product to be hydrogenated to be dissolved at the reaction temperature.

The hydrogenation is carried out by stirring the reaction mixture while maintaining the hydrogen pressure and reaction temperature. The hydrogenation is complete when hydrogen is no longer taken up.

Upon completion of the hydrogenation, the catalyst mass can be separated from the liquid by filtration, preferably carried out under hydrogen pressure, and the catalyst mass may be used again. Alternatively, the catalyst mass may be allowed to settle out of the reactor liquid while maintaining the hydrogen pressure. A portion of the reactor liquid is then removed, and the remaining catalyst suspension may be used again.

After any ammonia and inert solvent present have been evaporated from the reaction liquid obtained, a residue of hydrogenated product is left behind containing the 5-(4-aminobutyl)-hydantoin, and 1-ureido-5-aminocapronamide if 1-ureido-4-cyanovaleramide was present in the initial product to be hydrogenated. This residue is suitable, without further purification, for hydrolysis to lysine.

If water was used as the inert solvent in the hydrogenation, an aqueous solution of the hydrogenated product is obtained, which aqueous solution may be directly employed in the subsequent hydrolysis to lysine.

The process of the present invention is illustrated in greater detail in the following Examples 1–4. In Examples 5 and 6, the hydrogenation was carried out not employing the process of the present invention for the purpose of illustrating the superior results achieved by the present process.

EXAMPLE 1

To a 1 liter autoclave provided with a stirrer and a feed system, 2 g. of Raney nickel and 20 milliliters of ammonia water (25% of $NH_3$ by weight) were added, whereupon the autoclave was closed and 88 g. of ammonia were introduced through the feed system. Next, hydrogen was forced into the autoclave until a pressure of 20 atmospheres was reached, following which, with stirring, the temperature was raised to about 110° C. and the pressure to 70 atmospheres. To the catalyst suspension so obtained, a solution of 16.4 g. of 5-(3-cyanopropyl)-hydantoin in 75 milliliters of ammonia water (25% of $NH_3$ by weight) was added while continually stirring the contents of the autoclave. The stirring was then continued and the temperature and the hydrogen pressure were maintained until hydrogen was no longer taken up by the reaction mixture. After cooling and pressure release, the resulting reaction mixture was filtered and the filtrate evaporated till nearly dry. 19.9 g. of solid product were obtained which mainly contained 5-(4-aminobutyl)-hydantoin according to thin-layer chromatography. For the determination of the hydrogenation efficiency, the hydantoin was hydrolyzed to lysine. The raw 5-(4-aminobutyl)-hydantoin, together with 100 milliliters of hydrochloric acid (36% by weight of HCl), was heated in an autoclave to 175° C. for 4 hours, whereupon the solution obtained was evaporated till dry and a residue was obtained containing 18.9 g. of lysine dihydrochloride. This quantity of lysine dihydrochloride corresponds to a yield of 88% based on the original quantity of 5-(3-cyanopropyl)-hydantoin present. The hydrogenation efficiency, therefore, amounted to at least 88%.

EXAMPLE 2

To the autoclave as described in Example 1, 3 g. of Raney nickel and 135 g. of ammonia were added, whereupon hydrogen was forced into the autoclave until a pressure of 20 atmospheres was reached. Next, the temperature was raised to 110° C. and the pressure to 70 atmospheres while continually stirring the contents of the autoclave. Under these temperature and pressure conditions, a solution of 31.1 g. of 5-(3-cyanopropyl)-hydantoin in 300 milliliters of methanol, saturated with ammonia and having a temperature of 60° C., was added to the autoclave. The temperature and the hydrogen pressure were maintained until hydrogen was no longer taken up by the reaction mixture. The mixture in the autoclave was at all times well-stirred. After cooling to room temperature and release of pressure, the reaction mixture was filtered and the filtrate evaporated till dry. The raw 5-(4-aminobutyl)-hydantoin obtained was converted into lysine dihydrochloride in the same way as in Example 1 and 37.1 g. of lysine dihydrochloride were obtained, which corresponds to a yield of 91% based on the original quantity of 5-(3-cyanopropyl)-hydantoin present.

EXAMPLE 3

To the autoclave as described in Example 1, 1 g. of Raney nickel, 100 milliliters of methanol and 70 g. of ammonia were added, whereupon hydrogen was forced into the autoclave until a pressure of 20 atmospheres was reached. Next, the temperature was raised to 110° C. and the pressure to 62 atmospheres while continually stirring the contents of the autoclave. Under these conditions a solution of 14.2 g. of 5-(3-cyanopropyl)-hydantoin, 2.8 g. of 1-ureido-4-cyanovaleramide and 20 g. of ammonia in 200 milliliters of methanol were added to the catalyst suspension. Hydrogenation was continued until hydrogen was no longer taken up by the reaction mixture. After cooling and presure release, the reaction mixture was filtered and the filtrate evaporated till dry. The residue was converted into lysine dihydrochloride in the same way as in Example 1 and 19.3 g. of lysine dihydrochloride were obtained, corresponding to a yield of 87.8% based on the amount of 5-(3-cyanopropyl)-hydantoin and 1-ureido-4-cyanovaleramide initially present.

EXAMPLE 4

To the autoclave as described in Example 1, 2 g. of Raney cobalt, 100 milliliters of methanol and 87 g. of ammonia were added, whereupon hydrogen was forced into the autoclave until a pressure of 20 atmospheres was reached. Subsequently, the temperature was raised to 110° C. and the pressure to 62 atmospheres. While maintaining these conditions, a solution of 13.7 g. of 5-(3-cyanopropyl)-hydantoin and 15 g. of ammonia in 140 milliliters of methanol was added to the catalyst suspension. By supplying hydrogen, the pressure was maintained at about 70 atmospheres until hydrogen was no longer taken up by the reaction mixture. During the addition of the hydantoin and the hydrogenation, the reaction mixture was continually and thoroughly stirred, and the temperature was maintained at 110° C. After cooling and pressure release, the reaction mixture was filtered and the filtrate evaporated till dry, resulting in a residue consisting of 15.3 g. of raw 5-(4-aminobutyl)-hydantoin. The residue was converted, in the same way as in Example 1 to 14.65 g. of lysine dihydrochloride which corresponds to a yield of 81.5% based on the initial amount of 5-(3-cyanopropyl)-hydantoin.

For the purpose of camparison, the following examples were carried out without employing the process of the present invention.

EXAMPLE 5

16.7 g. of 5-(3-cyanopropyl)-hydantoin, 1 g. of Raney nickel and 10 g. of liquid ammonia were added to an autoclave which was cooled with solid carbon dioxide. After the autoclave had been closed, hydrogen was forced into it until a presure of 105 atmospheres was reached. Subsequently, while stirring, the temperature was raised to 140–150° C. and, by the addition of hydrogen, the pressure was kept to 105–140 atmospheres until hydrogen was no longer taken up by the reaction mixture. After cooling the reaction mixture to room temperature, the pressure was released. When most of the ammonia had evaporated, methanol was added and the reaction mixture filtered. The filtrate was evaporated till dry leaving 17 g. of a dark-green, glassy product which contained 5-(4-aminobutyl)-hydantoin according to thin-layer chromatography. The raw hydantoin was converted into lysine dihydrochloride in the same way as in Example 1, and 12.1 g. of lysine dihydrochloride were obtained, corresponding to a yield of 55% based on the amount of 5-(3-cyanopropyl)-hydantoin initially present.

EXAMPLE 6

To 0.5 liter autoclave 16.7 g. of 5-(3-cyanopropyl)-hydantoin, 150 milliliters of methanol, 52 g. of $NH_3$ and 2 g. of Raney nickel were added. Subsequently, hydrogen was forced into the autoclave until a pressure of 66 atmospheres was reached. While stirring, the temperature was raised to 120° C., and the total pressure amounted to 90 atmospheres. These reaction conditions were maintained until hydrogen was no longer taken up by the reaction mixture. After cooling and pressure release, the reaction mixture was filtered and the filtrate evaporated till dry. The resulting raw 5-(4-aminobutyl)-hydantoin was, in the same way as in Example 1, converted into lysine dihydrochloride, 12.6 g. of lysine dihydrochloride being obtained. This corresponds to a yield of 57.4% based on the amount of 5-(3-cyanopropyl)-hydantoin initially present.

What is claimed is:

1. In a process for the preparation of 5-(4-aminobutyl)-hydantoin by the liquid phase hydrogenation of 5-(3-cyanopropyl)-hydantoin in the presence of a hydrogenation catalyst, the improvement consisting essentially in adding said 5-(3-cyanopropyl)-hydantoin to a suspension of said catalyst in an inert solvent in which said 5-(3-cyanopropyl)-hydantoin is substantially soluble, after said suspension has attained a temperature of at least 50° C. and has been placed under hydrogen pressure.

2. The process of claim 1 wherein said inert solvent is water.

3. The process of claim 2 wherein said 5-(3-cyanopropyl)-hydantoin is added to said catalyst suspension as an ammoniacal aqueous solution.

4. A process for the preparation of 5-(4-aminobutyl)-hydantoin and 1-ureido-5-aminocapronamide by the liquid phase hydrogenation of a mixture 5-(3-cyanopropyl)-hydantoin and 1-ureido-4-cyanovaleramide in the presence of a hydrogenation catalyst, said process consisting essentially in adding said mixture to be hydrogenated to a suspension of said catalyst in an inert solvent in which said mixture is substantially soluble, after said suspension has attained a temperature of at least 50° C. and has been placed under hydrogen pressure.

5. The process of claim 4 wherein said inert solvent is water.

6. The process of claim 5 wherein said mixture to be hydrogenated is added to said catalyst suspension as an ammoniacal aqueous solution.

References Cited
UNITED STATES PATENTS 2,688,023   8/1954   Rogers _____ 260—309.5

HENRY R. JILES, Primary Examiner

G. T. TODD, Assistant Examiner

U.S. Cl. X.R.

260—553 R, 534 L